(12) United States Patent
Sames

(10) Patent No.: US 8,715,043 B2
(45) Date of Patent: May 6, 2014

(54) COVERAGE DEVICE

(71) Applicant: Poly-clip System GmbH & Co. KG, Hattersheim (DE)

(72) Inventor: Jörg Sames, Alten Buseck (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 13/958,532

(22) Filed: Aug. 2, 2013

(65) Prior Publication Data

US 2014/0038506 A1 Feb. 6, 2014

(30) Foreign Application Priority Data

Aug. 3, 2012 (EP) ..................................... 12179296

(51) Int. Cl.
*A22C 11/00* (2006.01)
(52) U.S. Cl.
USPC .......................................................... 452/35
(58) Field of Classification Search
USPC .................. 452/21–26, 30–35, 37, 46–48, 51
See application file for complete search history.

(56) References Cited

U.S. PATENT DOCUMENTS

| | | | | | |
|---|---|---|---|---|---|
| 3,919,739 | A | * | 11/1975 | Kawai | 452/31 |
| 4,447,933 | A | * | 5/1984 | Spiegelberg | 452/37 |
| 4,563,792 | A | * | 1/1986 | Niedecker | 452/31 |
| 4,624,030 | A | * | 11/1986 | Dreisin | 452/35 |
| 4,646,386 | A | * | 3/1987 | Dreisin | 452/31 |
| 5,356,331 | A | * | 10/1994 | Madrigal-Ocegueda | 452/32 |
| 5,816,903 | A | * | 10/1998 | Idziak | 452/49 |
| 5,916,019 | A | * | 6/1999 | Whittlesey | 452/35 |
| 6,651,705 | B1 | | 11/2003 | Töpfer | |
| 7,513,821 | B2 | | 4/2009 | Waldstädt | |
| 7,597,613 | B2 | * | 10/2009 | Staudenrausch | 452/32 |
| 7,604,531 | B2 | * | 10/2009 | Hanten | 452/48 |
| 2007/0089379 | A1 | | 4/2007 | Töpfer | |
| 2012/0175015 | A1 | | 7/2012 | Jens | |

FOREIGN PATENT DOCUMENTS

DE 19953695 C1 1/2001
EP 1897447 A1 3/2008

* cited by examiner

*Primary Examiner* — Richard Price, Jr.
(74) *Attorney, Agent, or Firm* — Hahn Loeser & Parks LLP

(57) ABSTRACT

The present invention relates to a clipping machine for producing sausage-shaped products by filing a flowable filling material into a tubular or bag-shaped packaging casing and closing said packaging casing by at least one closure means. The clipping machine comprises a filling tube having a first end, a second end and a central axis, the first end of the filing tube is directed in the feeding direction and the second end can pivotally be coupled to a filler device. The clipping machine further comprises a coverage device for covering a gap between the first end of the filling tube and a casing brake assembly including brake means for applying tension to the tubular or bag-shaped packaging casing when being filled, gathering means for gathering the filled tubular or bag-shaped packaging casing and for forming a plait-like portion thereto, and a clipping device having a clipping tool assembly.

17 Claims, 3 Drawing Sheets

COVERAGE DEVICE

This application claims priority to, and the benefit of, European Patent Application No. 12 179 296.4-1260 filed Aug. 3, 2012 with the European Patent Office, which is hereby incorporated by reference.

BACKGROUND OF THE INVENTION

The present invention relates to a clipping machine for producing sausage-shaped products.

In particular, the present invention relates to a clipping machine for producing sausage-shaped products, like sausages, by filing a flowable filling material along a feeding direction into a tubular or bag-shaped packaging casing and closing said packaging casing by at least one closure means, like a closure clip on one of its front ends facing in the feeding direction. The clipping machine comprises a filling tube having a first end, a second end and a central axis, for feeding the filling material in the feeding direction into the tubular or bag-shaped packaging casing stored on the filling tube. The first end of the filing tube is directed in the feeding direction and the second end can pivotally be coupled to a filler device. The clipping machine further comprises a casing brake assembly including brake means accommodated in a housing, for applying tension to the tubular or bag-shaped packaging casing when being filled, gathering means for gathering the filled tubular or bag-shaped packaging casing and for forming a plait-like portion thereto, and a clipping device having a clipping tool assembly for applying and closing at least one closure means to the plait-like portion.

In the production of sausage-shaped products, like sausages, clipping machines are used. In these machines, filling material is fed into respective tubular or bag-shaped packing casings, and closure means, like substantially U-shaped closure clips, are applied to said packing casing for closing the packing casing at both of its ends. Additionally, loops for pendulous storing said packed goods, wrist straps and/or labels may be attached to the packing casing by means of the closure clip.

Conventionally, the tubular or bag-shaped packaging casing material is stored on the filling tube, and is pulled-off by the filling material when fed through the filling tube. For refilling tubular casing material onto the filing tube, it is known from EP patent 1 897 447 to provide a filling tube which comprises a joint construction at its end facing away from the clipping device or its rear end, and which is pivotally supported by said joint construction. For refilling a supply of tubular or bag-shaped casing material onto the filling tube, the filling tube is pivoted about the pivot axis of the joint construction. Thereby, the end of the filling tube facing the clipping device or its front end is moved away from the clipping machine.

As also known, a casing brake assembly is positioned on the front end of the filling tube for applying tension to the tubular or bag-shaped casing material when being pulled-off from the filling tube while being filled. For refilling tubular casing material onto the filling tube, the casing brake assembly may be arranged axially shiftable in the feeding direction of the filling material, to be removed from the front end of the filling tube. A casing brake assembly of this kind is known from DE patent 199 53 695.

After tubular casing material has been refilled, the filling tube is pivoted back by moving its front end towards the clipping machine, and the casing brake assembly is shifted onto the front end of the filling tube. For shifting the casing brake assembly back onto the filling tube, its front end has exactly to be positioned vis-a-vis the casing brake assembly or its opening being shifted onto the filling tube, in order to avoid damaging the tubular casing material or elements of the casing brake, like a brake ring, or the filling tube itself. In this known clipping machines, there is a gap between the front end of the filling tube and the casing brake assembly, at least in a situation before the casing brake assembly is shifted onto the filling tube. In this situation, an operator, after having refilled casing material onto the filling tube, may engage said gap, causing an injury, or any other things, like tools, may engage said gap, causing damages to the clipping machine or the casing material. Moreover, in case of a filling tube being pivotable about a pivot axis in the region of its rear end such correct positioning of the filling tube may not always be guaranteed.

Thus, it is an object of the present invention to provide a clipping machine with which the above mentioned drawbacks can be overcome and which allows a save operation of the clipping machine.

SUMMARY OF THE INVENTION

The aforesaid object is achieved by the features of independent claim 1. Advantageous configurations are described there below.

According to the present invention, there is provided a clipping machine for producing sausage-shaped products, like sausages, by filing a flowable filling material along a feeding direction into a tubular or bag-shaped packaging casing and closing said packaging casing by at least one closure means, like a closure clip on one of its front ends facing in the feeding direction. The clipping machine comprises a filling tube having a first end, a second end and a central axis, for feeding the filling material in the feeding direction into the tubular or bag-shaped packaging casing stored on the filling tube, the first end of the filing tube is directed in the feeding direction and the second end can pivotally be coupled to a filler device. The clipping machine further comprises a casing brake assembly including brake means accommodated in a housing, for applying tension to the tubular or bag-shaped packaging casing when being filled, gathering means for gathering the filled tubular or bag-shaped packaging casing and for forming a plait-like portion thereto, and a clipping device having a clipping tool assembly for applying and closing at least one closure means to the plait-like portion.

The clipping machine according to the present invention further comprises a coverage device for covering a gap between the first end of the filling tube and the casing brake assembly. The coverage device thereby securely prevents an unintentional engagement of the gap, and thus, damages to the clipping machine or the casing material are avoided.

In order to release the first end of the filling tube for allowing the filling tube to be pivoted away from the clipping machine, the casing brake assembly is reversibly movable in the feeding direction between a release position in which at least the brake means are removed from the filling tube, and a working position in which at least the brake means are positioned on the filling tube in the region of its first end for applying tension to the tubular or bag-shaped packaging casing stored on the filling tube.

In an advantageous embodiment of the inventive clipping machine, the coverage device is attached to the housing of the casing brake assembly. In this configuration, the housing of the casing brake assembly supports the coverage device and no additional support means are necessary.

In a further advantageous configuration, the coverage device includes a first covering element extending from the housing of the casing brake assembly towards the filling tube in an at least approximately horizontal plane above the filling tube. Said first covering element securely covers the region above the gap between the casing brake assembly and the filling tube, and prevents anything from unintentionally falling into said gap.

It is further advantageous that the coverage device includes a second covering element extending from the housing of the casing brake assembly towards the filling tube in an at least approximately horizontal plane below the filling tube. Said second covering element additionally prevents anything from engaging the gap from below, e.g. an operator pivoting the filling tube towards the clipping machine after having refilled tubular or bag-shaped casing material to the filling tube.

In a preferred embodiment of the inventive clipping machine, the horizontal length of at least the first covering element in a direction vertically to the feeding direction, is larger than the diameter of the filling tube. The first covering element thereby does not only cover the gap in a direction vertically from above but also in an angle different from the vertical direction. It has to be understood that also the horizontal length of the second covering element in a direction vertically to the feeding direction, may be larger than the diameter of the filling tube, for covering the gap in any angle from below.

In a further preferred embodiment of the inventive clipping machine, the coverage device includes a third covering element extending from the housing of the casing brake assembly towards the filling tube in an at least approximately vertical plane extending between the filling tube and the clipping machine, for covering the gap in a direction towards the clipping machine.

According to an advantageous configuration, the third covering element is generally C-shaped with its open end facing the filling tube and the third covering element is coaxially aligned the filling tube. This C-shaped third covering element closely covers the gap between the housing of the casing brake assembly and the filling tube in a predefined and uniform distance in a direction towards the clipping machine.

In order to completely cover the gap between the housing of the casing brake assembly and the filling tube at least in the region covered by the covering elements, first, second and third covering elements of the coverage device form a generally U-shaped coverage extending from the housing of the casing brake assembly towards the filling tube. Thereby, clearances between the covering elements are avoided.

In a preferred configuration of the inventive clipping machine, the edges of the first, second and/or third covering element of the coverage device facing towards the filling tube comprise at least one chamfer. Said chamfer prevents the casing material from being damaged when sliding along said edges, e.g. when being pulled-off from the filling tube during the production process. Said chamfer also assists in guiding the casing material from the supply stored on the filling tube into housing of the casing brake assembly.

For allowing the tubular or bag-shaped casing material being pulled-off from the filling tube, a space in the form of a hollow cylinder segment is provided between the third covering element and the filling tube. This space is preferably of a dimension the enable at least a partially unfolding of the tubular or bag-shaped casing material when being pulled-off from the filling tube.

The coverage device according to the present invention includes a board-like element extending from the housing of the casing brake assembly towards the filling tube in the region between the first element and the second element. Said board-like element at least partially covers or reduces the gap between the housing of the casing brake assembly and the filling tube in a horizontal direction away from the clipping machine.

In an advantageous embodiment of the inventive clipping machine, the extension of board-like element from the housing of the casing brake assembly towards the filling tube is shorter than the extension of at least one of the first, second or third covering elements from the housing of the casing brake assembly towards the filling tube. In this configuration, the filling tube, during being pivoted towards or away from the clipping machine, the first end of the filling tube may pass the board-like element, whereby at least one of the first, second or third covering elements cover the gap between the housing of the casing brake assembly and the filling tube.

In order to prevent the casing material from being damaged when the filling tube is pivoted towards the filling machine, the board-like element comprises at least one chamfer at the edge facing away from the clipping machine. Said chamfers also assist in guiding the front end of the casing material into housing of the casing brake assembly.

In the inventive clipping machine, there may further be provided a sensor for detecting the current position of the filling tube. Alternatively or additionally, the sensor may also detect the current position of the casing brake assembly. The sensor may provide a signal to a control unit in order to allow the clipping machine to operate only with the filling tube and/or the casing brake assembly in a correct position.

Further advantages and a preferred embodiment will be described in the following together with the drawings listed below. The expressions "left", "right", "below" and "above" are referred to the drawings in an alignment such that the reference numbers used can be read in normal.

DETAILED DESCRIPTION

Figure 1:
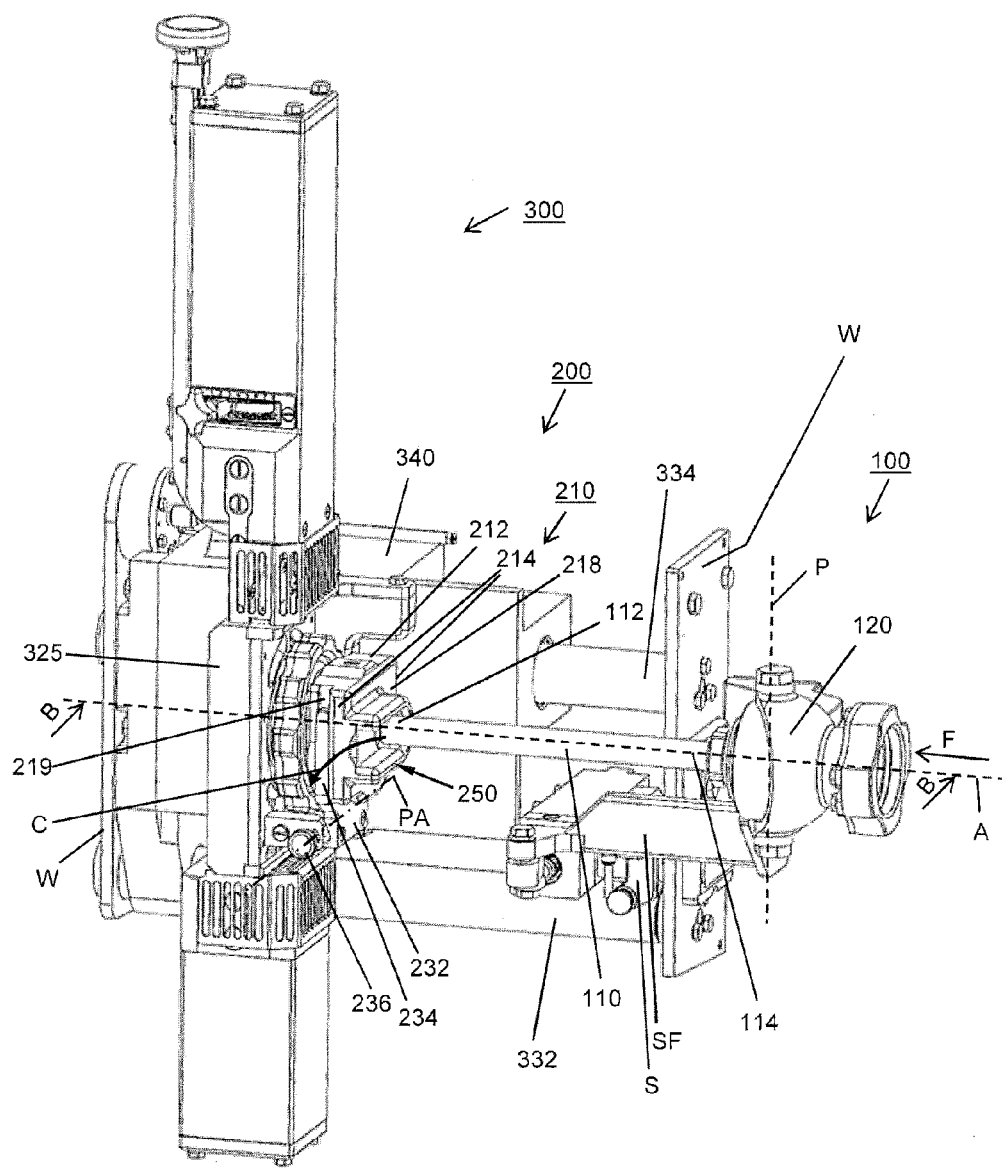
FIG. 1: is a schematically perspective view to an arrangement including a filling tube assembly, a casing brake assembly and a clipping module of a clipping machine according to the present invention.

FIG. 1 shows a schematically perspective view to an arrangement including a filling tube assembly 100, a casing brake assembly 200 and a clipping module 300 of a clipping machine according to the present invention.

Figure 2:
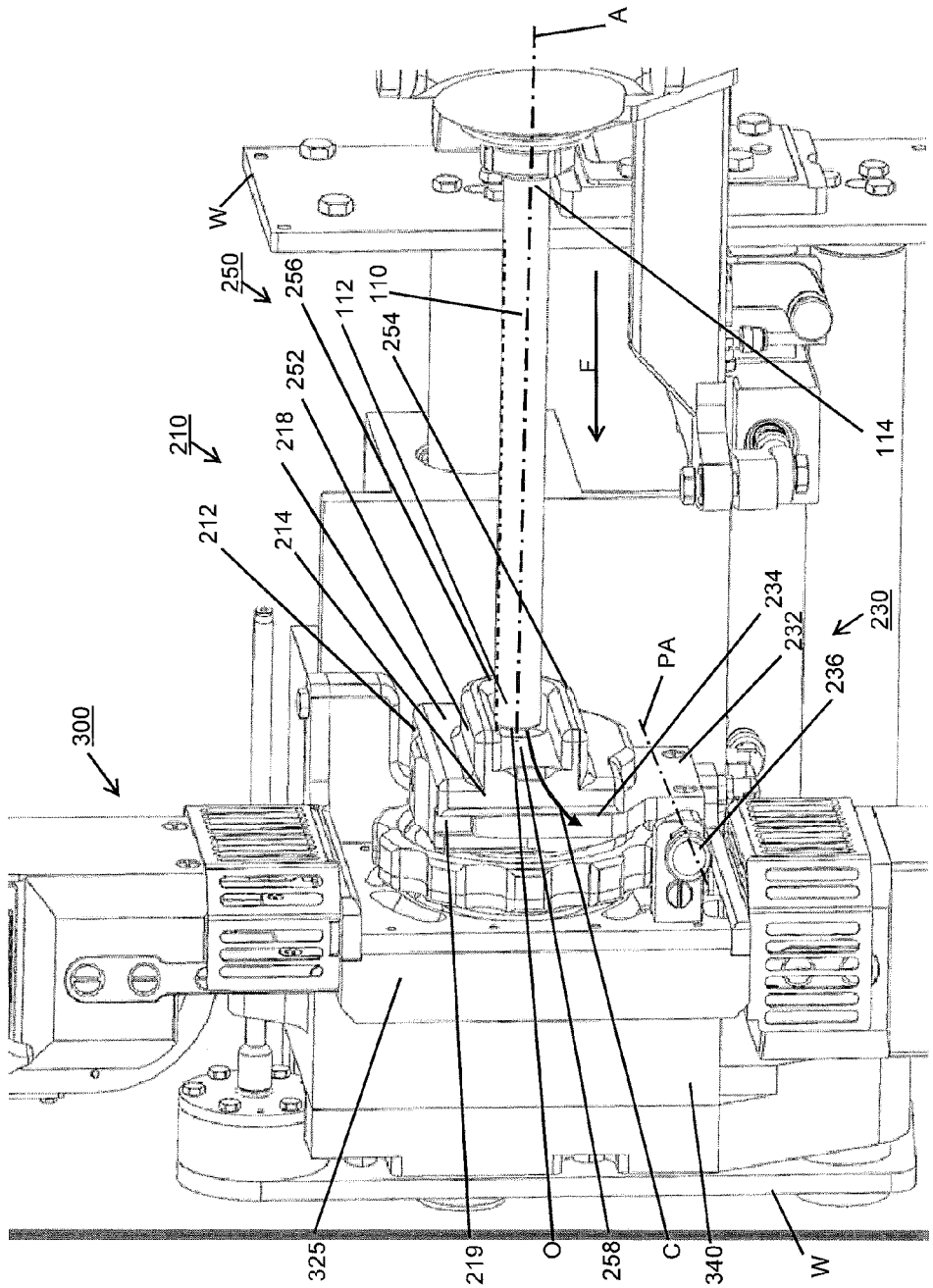
FIG. 2: is a detailed schematically perspective view to an arrangement according to FIG. 1.

As it can be inferred from FIG. 1, filling tube assembly 100 comprises a filling tube 110 having a first end 112, a second end 114 and a central axis A. FIG. 1 shows filling tube 110 in the filling position in which filling material can be fed through filling tube 110 in a feeding of filling direction F into the tubular or bag-shaped casing to be filled. The tubular or bag-shaped casing (in the following, named "tubular casing" and not shown) is stored on filling tube 110. Filling tube 110, when in the filling position, is aligned with its central axis A wherein feeding direction F is running from second end 114 of filling tube 110 to its first end 112, i.e. from the right to the left in FIG. 1. Filling tube 110 is coupled with its second end 112 to a joint arrangement 120 including a vertically aligned pivot axis P about which filling tube 110 is reversably pivotable in a horizontal plane wherein first end 112 thereby follows a partially circular path C (c.f. FIG. 2).

Figure 3:
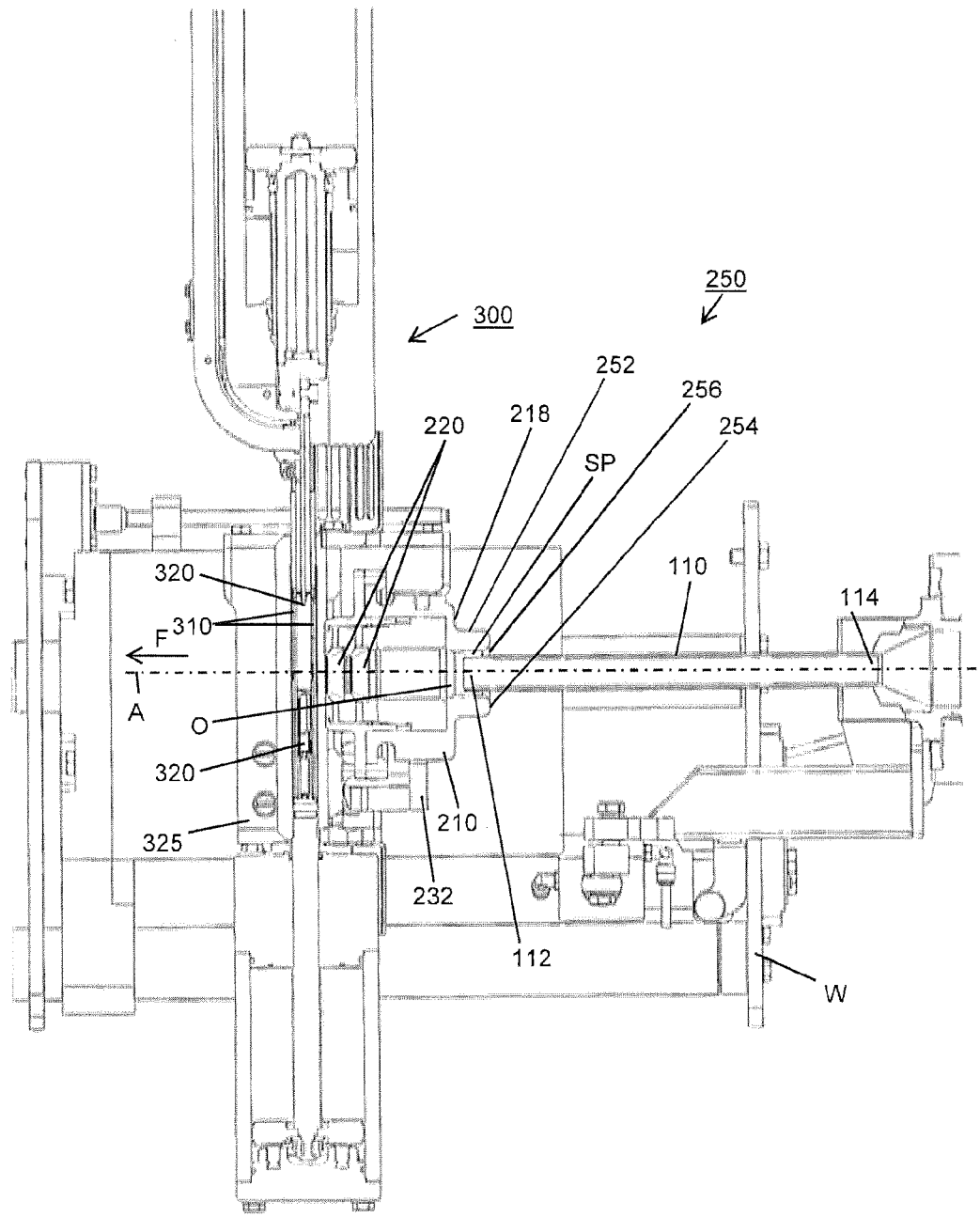
FIG. 3: is a detailed cross-sectional view to the arrangement in a vertical plane along line B-B in FIG. 1.

Casing brake assembly 200 includes a housing 210 and brake means in form of brake rings 220 (cf. FIG. 3). Housing 210 has upper and lower surfaces 212, rear and front surfaces 214, a left side surface 216 (not visible in FIG. 1) and a right side surface 218 facing opposite the feeding direction F. Housing 210 of casing brake assembly 200 further includes vertically aligned grooves 219 arranged in rear and front surfaces 214, by means of which casing brake assembly 200 is held in a fork-shaped support 230 with a base 232 and two parallel prongs 234 which engage grooves 219. Base 232 of fork-shaped support 230 is coupled to clipping module 300 via a locking pin 236 having a longitudinal axis PA extending in a horizontal plane vertically to filling direction F. For inserting or removing casing brake assembly 200 from the clipping machine, fork-shaped support 230 may be unlocked by pulling locking pin 236 in its longitudinal direction and pivoting fork-shaped support 230 about pivot axis PA away from clipping module 200, i.e. to the right in FIG. 1. After casing brake assembly 200 has been inserted into fork-shaped support 230, casing brake assembly 200 together with fork-shaped support 230 is pivoted about axis PA into the at least approximately vertical position shown in FIG. 1, and secured in this position by pushing back locking pin 236 in its longitudinal direction towards the clipping machine.

Casing brake assembly 200 further comprises a coverage device 250 which extends from right side surface 218 of housing 210 towards filling tube 110 in counter direction to feeding direction F, which will be described in greater detail in conjunction with FIG. 2 below.

Clipping module 300 comprises gathering means 310, clipping tools 320 (cf. FIG. 3), which are vertically guided in a common guide frame 325 and drive means 330 for gathering means 310 and clipping tools 320. Clipping module 300 is mounted to a drive means 340 for being reversibly driven in feeding direction F, along guide bolts 332, 334, in order to move casing brake assembly 200 between its release position and its working position. Guide bolts 232, 234 are connected to framework W of the clipping machine.

A sensor S is mounted to a support frame SF of joint arrangement 120 for detecting the current position of filling tube 110 or a part of joint arrangement 120 which is in a corresponding position. Sensor S is coupled to a control unit of the clipping machine. Based on the signal provided by sensor S, the operation of the clipping machine may be enabled or disabled.

FIG. 2 shows a detailed schematically perspective view to an arrangement according to FIG. 1. As it can be seen in FIG. 2, housing 210 of casing brake assembly 200 comprises a horizontal through hole aligned to central axis A of filling tube 110, which terminates in an opening O facing first end 112 of filling tube 110.

Coverage device 250 has a generally U-shape, and extends from right side surface 218 of housing 210 towards filling tube 110. Coverage device 250 includes a first covering element 252, a second covering element 254 and a third covering element 256 having a generally C-shape. First covering element 252 has the form of a straight bar and extends from right side surface 218 of housing 210 in a horizontal plane arranged above filling tube 110 referred to FIG. 1. First covering element or first straight bar 252 is aligned with its lower surface to uppermost edge of opening O. Second covering element 254 has also the form of a straight bar and extends from right side surface 218 in a horizontal plane arranged below filling tube 110. Second covering element or second straight bar 254 is aligned with its upper surface to lowermost edge of opening O. Third covering element or C-shaped portion 256 also extends from right side surface 218 towards filling tube 110 and partially surrounds first end 112 of filling tube 110, i.e. the rearmost half of first end 112 of filling tube 110.

As it can be seen in FIG. 2, first and second straight bars 252, 254 are coupled with their right ends to the left ends of C-shaped portion 256, and terminating with their left ends in a plane defined by front surface 214 of housing 210. The length of the first and second straight bars is larger than the diameter of filling tube 110.

As it further can be seen in FIG. 2, coverage device 250 further comprises a board-like element 258 which extends from right side surface 218 of housing 210 in a region between first and second straight bars 252, 254 and between opening O and front surface 214 of housing 210. Thereby, an approximately rectangular channel is formed between the surfaces of first and second straight bars 252, 254, facing each other, and the surface of board-like element 258 facing towards filling tube 110, through which first end 112 of filling tube 110 may be moved on partially circular path C.

The edges of first and second straight bars 252, 254 and C-shaped portion 256 facing away from casing brake assembly 200 comprise chamfers. Moreover, the edges of board-like element 258 facing towards and away from opening O also comprise chamfers.

As it further can be seen in FIG. 2, casing brake assembly 200 is held in fork-shaped support 230 which is coupled to guide frame 325 of clipping module 300 via locking pin 236, allowing casing brake assembly 200 together with fork-shaped support 230 to be pivoted about axis PA away from clipping module 200, i.e. to the right in FIG. 1 when filling tube 110, in particular its first end 112, is pivoted away from the clipping machine. In this position casing brake assembly 200 to be removed from the clipping machine by being pulled out of fork-shaped support 230.

FIG. 3 is a detailed cross sectional view to the arrangement of FIG. 1 in a vertical plane through central axis A of filling tube 110, along line B-B in FIG. 1.

The through hole in housing 210 of casing brake assembly 200 is coaxially aligned to central axis A of filling tube 210, with opening O facing first end 112 of filling tube 110.

Casing brake assembly 200 is coupled upstream to clipping module 300 in a fixed relation in feeding direction F, via fork-shaped support 230 which is mounted to guide frame 325. Thus, by reversibly moving clipping module 300 in feeding direction F by drive means 340, also casing brake assembly 200, and brake rings 220, respectively, are reversibly moved in feeding direction F and are reversibly shifted onto or from first end 112 of filling tube 110.

As shown in FIG. 3, casing brake assembly 200 comprises brake means in form of two brake rings 220 which are arranged coaxially to filling tube 110, in housing 210, facing towards clipping module 300. Coverage device 250 extends from the right side surface 218 of housing 210 towards filling tube 110 and at least partially surrounds first end 212 of filling tube 110. Between the outer surface of first end 212 of filling tube 110 or filling tube 110 itself, respectively, and the inner surface of C-shaped portion 256 of coverage device 250 as well as at least partially inner surfaces of first and second straight bar 252, 254, a space or cavity SP in form of a hollow cylinder segment is formed, having a desired width or distance between the outer surface of first end 212 and the inner surface of C-shaped portion 256 as well as at least partially inner surfaces of first and second straight bar 252, 254. As it further can be seen in FIG. 3, chamfers on first and second straight bars 252, 254 and C-shaped portion 256, facing towards filling tube 110 form a funnel-shaped inlet opening for the tubular casing stored on filling tube 110.

For producing sausage-shaped products, like sausages, filling material is fed in feeding direction F through filling tube 110 being in its straight (not pivoted) or working position shown in FIG. 1 into a tubular packaging casing which is closed at its front end. The packaging casing may be bag-shaped. That means, a prefabricated tubular casing section, already closed at its front end, is positioned on filling tube 110 for being filled. After a predetermined portion of filling material has been fed into the bag-shaped packaging casing, gathering means 310 form a plait-like portion on the packaging casing. Thereafter, one closure clip is attached to the plait-like portion and closed by clipping module 200, in particular by closing tool assembly 320. Alternatively, tubular packaging casing material may be used for producing sausage-shaped products. In this case, the front end of said tubular packaging casing is closed at its front end by a closure means, like a closure clip. After a predetermined portion of filling material has been fed into the tubular packaging casing, gathering means 310 form a plait-like portion on the tubular packaging casing. Thereafter, two closure clips are attached to the plait-like portion and closed by clipping module 200, a first closure clip in order to close the just filled section of the tubular casing packaging, and the second closure clip in order to close the front end of the remaining tubular packaging casing material. The just produced sausage-shaped product is severed from the remaining tubular packaging casing material by a cutting device (not shown).

At the beginning of the production process, casing brake assembly 200 is in the release position, as shown in FIGS. 1 to 3. In this position, right side surface 218 of housing 210 of casing brake assembly 200 is positioned immediately downstream first end 112 of filling tube 110. Also, in the release position, the surface of board-like element 258 facing towards filling tube 110, is positioned downstream first end 112 of filling tube 110. C-shaped portion 256 partially surrounds first end 112 of filling tube 110.

In the release position, first end 112 of filling tube 110 and thus filling tube 110 itself may be moved on partially circular path C through the channel between first and second straight bars 252, 254 by pivoting filling tube 110 about pivot axis P of joint arrangement 120, and tubular casing material may be refilled onto filing tube 110. Thereafter, first end 112 of filling tube 110 is moved back on partially circular path C through the channel between first and second straight bars 252, 254, to be positioned in coverage device 250, as shown in FIGS. 1 to 3.

During repositioning of first end 112 of filling tube 110, the gap between first end 112 of filling tube 110 and right side surface 218 of housing 210 of casing brake assembly 200 is covered by first and second straight bars 252, 254 from above and from below, and in the final position as shown in FIGS. 1 to 3, said gap is also covered at the rear side of filling tube 110 by C-shaped portion 256 which partially surrounds first end 112 of filling tube 110. Thereby, the operator holding the tubular casing in a desired position on filling tube 110, is prevented from reaching into said gap. Moreover, when moving first end 112 of filling tube 110 together with the tubular casing material stored thereon, the chamfers on the edges of board-shaped element 258 assist in guiding the casing material into the channel between first and second straight bars 252, 254, and also into opening O of housing 210 of casing brake assembly 200, thereby preventing tubular casing from being damaged.

As the next step, casing brake assembly 200 is shifted onto filling tube 110 until brake rings 220 are positioned on filling tube 110 in the region of first end 112 of filling tube 110, which is the working position of casing brake assembly 200. First end 112 of filling tube 110, in the working position of casing brake assembly 200, is completely enclosed in housing 210 of casing brake assembly 200, but does not reach into the space between the gathering means 210 or closing tool assembly 220. Accordingly, in the working position, coverage device 250 covers the gap between filling tube 110 opening O of housing 210 of casing brake assembly 200.

After casing brake assembly 200 has brought into the working position, the filling process starts. Filling material is fed in feeding direction F through filling tube 110 into the tubular casing stored on filling tube 110 and closed at its front end. In case that the tubular casing material is not initially closed at its front end, the filling operation may also start by applying a closure clip to the front end of the tubular casing before feeding filling material thereto. After a predetermined portion of filling material has been fed into the tubular casing, the filled tubular casing portion is gathered by gathering means 310, whereby a plait-like portion is formed thereon. Clipping tool assembly 220 then places and closes two closure clips on said plait-like portion. The just produced sausage-shaped product is then severed from the remaining tubular casing material, e.g. by a cutting device (not shown), and is discharge from the clipping machine.

The tubular casing stored on filling tube 110 is folded in its longitudinal direction in a known manner. During filling, the tubular casing is pulled-off from filling tube 110, and is thereby unfolded by casing brake assembly 200.

As mentioned, between the outer surface of first end 212 of filling tube 110 and the inner surface of C-shaped portion 256 of coverage device 250, a space or cavity SP is formed. The width of cavity SP is selected as to have an outer diameter which is smaller than the outer diameter of the tubular casing in its folded state when delivered or stored on filling tube 110. When being pulled-off from filling tube 110, the tubular casing thereby is at least partially unfolded when being pulled into the funnel-shaped inlet opening formed by the chamfers on first and second straight bars 252, 254 and C-shaped portion 256, facing towards filling tube 110, and through cavity S.

After the supply of tubular casing material stored on filling tube 110, has been spent, casing brake assembly 200, together with clipping module 300, is shifted by drive device 340 into the release position, and tubular casing material may be refilled onto filling tube 110 as described above.

Sensor S detects the current position of filling tube 110 and, e.g. may prevent starting the clipping machine when filling tube 110 is in the refill position, by sending a respective signal to the control unit of the clipping machine.

Coverage device 250 has been described as having a substantially U-shaped design. Naturally, in order to provide the horizontal and vertical coverage functions, only a lower horizontal bar portion for providing a horizontal coverage is sufficient. Also, C-shaped portion 256 may be formed by a straight bar-shaped element which sufficiently covers the rear side of the gap between filling tube 110 and casing brake assembly 200.

It has to be understood that the casing brake assembly not necessarily needs to be coupled to the clipping module. The casing brake assembly may also separately be shiftable along the central axis of the filling tube, independently from the clipping module.

The invention claimed is:

1. A clipping machine for producing sausage-shaped products by filing a flowable filling material along a feeding direction into a tubular or bag-shaped packaging casing and closing said packaging casing by at least one closure means on one of its front ends facing the feeding direction, wherein the clipping machine comprises a filling tube having a first end, a second end and a central axis, for feeding the filling material in the feeding direction into the tubular or bag-shaped packaging casing stored on the filling tube, the first end of the filing tube is directed in the feeding direction and the second end can pivotally be coupled to a filler device, and wherein the clipping machine comprises a casing brake assembly including brake means accommodated in a housing, for applying tension to the tubular or bag-shaped packaging casing when being filled, gathering means for gathering the filled tubular or bag-shaped packaging casing and for forming a plait-like portion thereto, and a clipping device having a clipping tool assembly for applying and closing at least one closure means to the plait-like portion,
where the clipping machine further comprises a coverage device configured to at least partially cover a gap between the first end of the filling tube and the casing brake assembly.

2. The clipping machine according to claim 1,
wherein the casing brake assembly is reversibly movable in the feeding direction between a release position in which at least the brake means are removed from the filling tube, and a working position in which at least the brake means are positioned on the filling tube in the region of its first end for applying tension to the tubular or bag-shaped packaging casing stored on the filling tube.

3. The clipping machine according to claim 1,
wherein the coverage device is attached to the housing of the casing brake assembly.

4. The clipping machine according to claim 1,
wherein the coverage device includes a first covering element extending from the housing of the casing brake assembly towards the filling tube in an at least approximately horizontal plane above the filling tube.

5. The clipping machine according to claim 4,
wherein the coverage device includes a second covering element extending from the housing of the casing brake assembly towards the filling tube in an at least approximately horizontal plane below the filling tube.

6. The clipping machine according to claim 5,
wherein the coverage device includes a third covering element extending from the housing of the casing brake assembly towards the filling tube in an at least approximately vertical plane extending between the filling tube and the clipping machine.

7. The clipping machine according to claim 6,
wherein the third covering element is generally C-shaped with its open end facing the filling tube, and wherein the third covering element is coaxially aligned the filling tube.

8. The clipping machine according to claim 6,
wherein the first, second and third covering elements of the coverage device form a generally U-shaped coverage extending from the housing of the casing brake assembly towards the filling tube.

9. The clipping machine according to claim 6,
wherein the edges of the first, second and/or third covering element of the coverage device facing towards the filling tube comprise at least one chamfer.

10. The clipping machine according to claim 6,
wherein a space in the form of a hollow cylinder segment is provided between the third covering element and the filling tube.

11. The clipping machine according to claim 5,
wherein the coverage device includes a board-like element extending from the housing of the casing brake assembly towards the filling tube in the region between the first covering element and the second covering element.

12. The clipping machine according to claim 11,
wherein the extension of board-like element from the housing of the casing brake assembly towards the filling tube is shorter than the extension of at least one of the first, second or third covering elements from the housing of the casing brake assembly towards the filling tube.

13. The clipping machine according to claim 11,
wherein the board-like element comprises at least one chamfer at the edge facing away from the clipping machine.

14. The clipping machine according to claim 5,
wherein the horizontal length of at least the first covering element in a direction vertically to the feeding direction, is larger than the diameter of the filling tube.

15. The clipping machine according to claim 4,
wherein the horizontal length of at least the first covering element in a direction vertically to the feeding direction, is larger than the diameter of the filling tube.

16. The clipping machine according to claim 15,
wherein the coverage device includes a third covering element extending from the housing of the casing brake assembly towards the filling tube in an at least approximately vertical plane extending between the filling tube and the clipping machine.

17. The clipping machine according to claim 1,
wherein a sensor is provided for detecting the current position of the filling tube.

* * * * *